Figure 1:
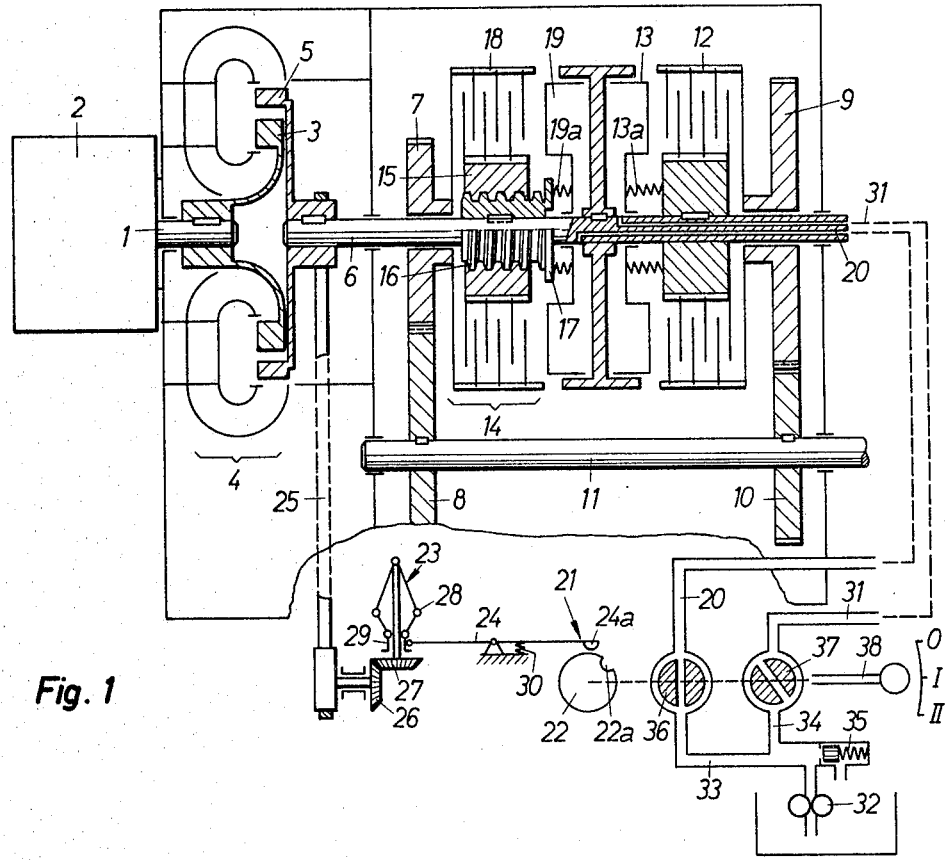

Aug. 2, 1966   G. E. E. LAMMERZ   3,263,528
HYDRAULIC POWER TRANSMISSION, ESPECIALLY FOR USE
IN CONNECTION WITH RAIL VEHICLES
Filed May 25, 1962

INVENTOR.
Gustav Eduard Ernst Lammerz
  deceased
BY

United States Patent Office 3,263,528
Patented August 2, 1966

3,263,528
HYDRAULIC POWER TRANSMISSION, ESPECIALLY FOR USE IN CONNECTION WITH RAIL VEHICLES
Gustav Eduard Ernst Lammerz, deceased, late of Essen, Germany, by Ilse Hedwig Elisabeth Karoline Lammerz, née Roth, heir, and Alfred Köss, guardian of minor heir, both of Essen, Germany, assignors to Voith-Getriebe Kommanditgesellschaft, Heidenheim (Brenz), Germany
Filed May 25, 1962, Ser. No. 199,218
Claims priority, application Germany, June 2, 1961, B 62,761
6 Claims. (Cl. 74—731)

The present invention relates to a hydraulic power transmission, preferably for use in connection with rail vehicles. With rail vehicles which are driven by a Diesel-hydraulic drive, it is known to convey the pulling force from the driving engine and the fluid flow transmission to a mechanical change gear transmission which includes an overriding clutch for the slowest velocity range. This overriding clutch will automatically disengage when the next higher velocity range is engaged whereby the change in the velocity range is for all practical purposes effected without an interruption of the pulling force. When shifting downwardly, i.e. when disengaging the higher velocity range, the overriding clutch likewise automatically engages again as soon as the accelerating turbine shaft as drive shaft of the change gear transmission has reached the speed of the output shaft.

With a driving arrangement of this type, special devices are required in order to be able to control the power transmission and in particular to engage and disengage the same. Thus, for instance, it is known to this end to provide a special shift clutch between driving engine and fluid flow transmission. Such disc clutch on the primary side, however, causes difficulties, especially with heavy engines characterized by a high difference in speed during full output operation and during idling operation because the gear rings of the discs may be destroyed in a short period of time in view of the non-uniformity of the engine torque.

A further possibility consists in interrupting the power transmission in the fluid flow transmission itself either by emptying the circuit of said fluid flow transmission or by shutting off said circuit by adjusting the blades, employing displaceable blade rings, or by similar steps. The filling and emptying of fluid flow circuits is, however, time consuming for some control operations, and fluid flow transmissions with a circuit adapted to be shut off require relatively many parts and are, therefore, expensive.

It is, therefore, an object of the present invention to provide a hydraulic power transmission, especially for use in connection with rail vehicles, which will overcome the above mentioned drawbacks.

It is a further object of this invention to provide a hydraulic power transmission, especially for use in connection with rail vehicles, which will make it possible to engage and disengage the power transmission without resorting to a clutch arranged in the power path between the driving machine and the primary part of the fluid flow circuit.

It is still another object of this invention to provide a hydraulic power transmission as set forth in the preceding paragraph, which will be able to control the power transmission while employing a simple fluid flow transmission with non-adjustable blades, stationary guide wheel ring and permanently filled circuit.

Figure 2:
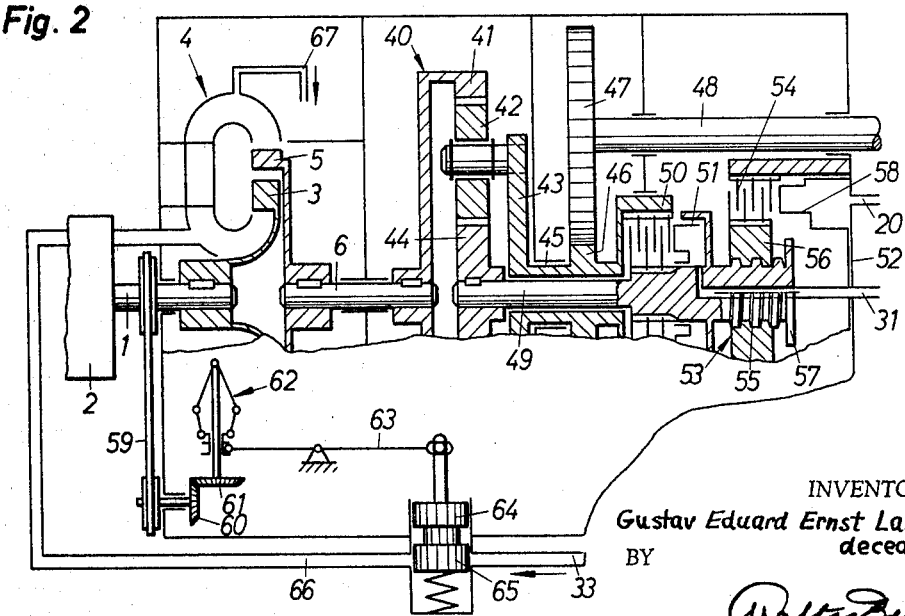

These and other objects and advantages of the invention will appear more clearly from the following specification in connection with the accompanying drawing in which:

FIGURE 1 diagrammatically illustrates a two-speed transmission with a counter shaft, according to the present invention;

FIGURE 2 illustrates a two-speed transmission similar to that of FIGURE 1 but equipped with a planetary gear.

The present invention is based on the idea with a hydraulic power transmission of the above mentioned type to interrupt the power transmission not ahead of the fluid flow circuit or within the same but behind said fluid flow circuit, and to this end so to design the clutch or brake device of the slowest velocity range of the mechanical change gear transmission driven by the turbine wheel of the fluid flow transmission that said clutch or brake device may be disengaged at will. In this connection, when engaging the clutch or brake device, it is necessary that the torque of the turbine wheel, which torque is to be absorbed by the clutch or brake device, will be held as low as possible because otherwise the clutch or brake device which normally absorbs only a small friction work would have to be dimensioned considerably stronger. It is well known that the torque of the turbine wheel is proportional to the second power of the motor speed. The engagement of the clutch or brake device must, therefore, be admissible only at low speeds or at a standstill of the driving engine. The hydraulic power transmission according to the invention which, while not limited to, is particularly advantageous for use in connection with rail vehicles, is characterized by a combination of the following features:

(a) The driving engine which is adjustable as to speed is continuously rigidly drivingly connected to the pump wheel of the fluid flow transmission.

(b) The turbine wheel of the fluid flow transmission drives a mechanical change gear transmission which for the slowest velocity range has a clutch or brake device adapted automatically to be disengaged in the faster velocity ranges.

(c) The clutch or brake device comprises a device adapted to bring about disengagement at will and which will permit the engagement at low speeds only of the driving engine.

The clutch or brake device may for higher outputs consist in a manner known per se of a friction disc packet which may be compressed by screwing, while the counter holding member for disengagement of the device is displaceable by fluid pressure.

Referring now to FIG. 1 in detail, the arrangement shown therein comprises a diesel engine 2 having a crank shaft 1 rigidly connected to the pump wheel 3 of a fluid flow transmission 4. The turbine wheel 5 of said transmission 4 drives through turbine shaft 6 a mechanical two-speed transmission which comprises the gear pairs 7 and 8 of the lower velocity range and the gear pairs 9 and 10 of the fast velocity range. The gears 7 and 9 are rotatable on turbine shaft 6 and are adapted to be clutched thereto, whereas the gears 8 and 10 are keyed to the output shaft 11 of the transmission, said output shaft being parallel to the turbine shaft 6.

The friction disc shiftable clutch 12 with the hydraulically operable pressure piston 13, which operates against the opposing springs 13a, serves for drivingly connecting the gear 9 to the turbine shaft 6 in the fast velocity range. gear 7 on the other hand is through overriding clutch 14 connected to turbine shaft 6 in the lower velocity range. The clutch 14 consists of a disc packet 18 the discs of which are adapted to be compressed by screwing nut 15 on thread 16 up to the abutment 17. When the counter holding member 19, which is operable hydraulically against the opposing springs 19a, is displaced toward the left, the clutch 14 will in a manner known per se automatically engage or disengage as soon as the shift clutch 12 is engaged or disengaged. If, however, the counter holding member 19 has been displaced toward the right, the overriding clutch is already disengaged and thus ineffective. A locking device 21 in the fluid medium conduit 20 for the counter member 19 will see to it that the overriding clutch once disengaged can be engaged again only at low speeds of the diesel engine 2.

The locking device 21 is essentially comprised of a control disc 22 which can be locked in a given position by means of a lever 24 operated by a centrifugal governor 23. The centrifugal governor 23 is driven by the turbine shaft 6 via a belt 25 and a bevel gear pair 26/27. The pendulum weights 28 of the centrifugal governor 23 operate a sleeve 29 into which the lever 24 engages. With low speeds the pendulum weights 28 will hardly move outwards. At such time, the position of the lever 24 assisted by a spring 30 is such that the control disc 22 cannot be locked. Only with rising speed of the turbine shaft 6 a cam 24a at the right end of the lever 24 moves downwards and presses against the control disc 22. When the control disc 22 has reached a position in which the recess 22a is on top, the cam 24a engages and locks the control disc 22.

The piston 13 of the shiftable clutch 12 is made operative through a conduit 31. Both conduits 20 and 31 are supplied with pressure oil via the respective conduit sections 33 and 34 by means of the pump 32 fitted with a relief valve 35. To ensure correct operation of the two gear shifts, in the two conduit sections 33 and 34 valves 36 and 37 are arranged, both of which are operated by a lever 38 in such a way that when the lever 38 is in position "O" both conduits 33 and 34 are shut off, while with the lever 38 in position "I" the conduit 34 is shut off and the conduit 33 cleared (at such time, the first speed range becomes effective), and with the lever 38 in position "II" the conduit 33 is shut off and the conduit 34 cleared (at such time the second speed range becomes effective).

Furthermore, as shown in principle by dotted lines in FIG. 1, the lever 38 is connected to the control disc 22 in such a way that with the lever 38 in position "O" the recess 22a is on top. As with higher speeds of the turbine shaft 6 the cam 24a is pressed downwards by the lever 24, the lever 38 is locked when the control disc 22 is in this position, and so at higher speeds it is impossible to engage speed range "I."

FIG. 2 again shows the diesel engine 2 with the crank shaft 1, the pump wheel 3 of a fluid flow transmission 4, the turbine wheel 5 and the turbine shaft 6. Contrary to the transmission according to FIG. 1, in FIG. 2 the turbine shaft 6 is rigidly connected to the outer rim 41 of a planetary ring gear 40. The planetary gear wheel 42 of this transmission 40 is arranged loosely and rotatably on the planetary gear carrier 43 which is drivingly connected to the output shaft 48 through a hollow shaft 45 and a gear wheel pair 46/47. The sun wheel 44 of the planetary gear 40 is keyed onto a shaft 49. The shaft 49 further carries a friction disc shiftable clutch 50 which is hydraulically operated by means of the pressure piston 51, whereby the sun wheel 44 is connected to the planetary gear carrier 43. Furthermore, the shaft 49 carries a brake 53 of which one part is connected to the gear housing 52 in such a way that one half of the disc packet 54 is axially shiftable while not being rotatable. The other half of said disc packet 54 is arranged on a nut 56 so as to rotate therewith and so as to be axially displaceable therealong. The nut 56 can be moved on the thread 55 of the shaft 49 against a stop 57. A counter holding member 58 is hydraulically operated, and, as a result, the brake 53 becomes operative. In order to keep the masses, which are to be accelerated during the engagement of the brake, as low as possible, it may be mentioned that the counter holding member 58 does not form part of the rotating parts of the brake 53. The operation of clutch 50 and brake 53 is effected as in the case of the transmission according to FIG. 1 via the conduits 20 and 31.

The two speed ranges are made operative, as in the case of the transmission in FIG. 1 via the switching equipments 22, 23 and 36 to 38 which are not shown in FIG. 2. With the transmission in neutral, the outer rim 41 rotates without driving the planetary gear carrier 43. In the low speed range (I) the sun wheel 44 is locked by the brake 53, and, as a result, the planetary gear carrier 43 rotates at a lower speed than the outer rim 41. In the high-speed range (II) the brake 53 is separated from the housing 52 as the clutch 50 is engaged, and so the sun wheel 44 is coupled to the planetary gear carrier 43. Thus, the planetary gear 40 revolves as a whole with a transmission ratio of 1:1.

The fluid flow transmission 4 according to FIG. 2 embodies a control device additionally to the fluid flow transmission in FIG. 1. This device reduces the filling pressure at low speeds of the driving diesel engine 2 in order to minimize the magnitude of the torque transmitted by the diesel engine to the planetary gear, if the low speed range is made effective as a result of the operation of the brake 53. To achieve operation of the brake 53 at reduced filling pressure only, the crank shaft 1 via a belt 59 and a bevel gear pair 60/61 drives a centrifugal governor 62, which with low speeds moves a piston 64 via a lever 63 to a position in which the operating pressure of the fluid flow transmission in the filling conduit 66 is throttled by a conical part 65 of the piston 64. This pressure is created by the pump 32 (shown in FIG. 1) and acts in the conduit 33. The fluid flow transmission 4 has an outlet 67 of a constant cross-sectional area so that the inflow through the filling conduit 66 is a measure for the filling pressure, and thus of the magnitude of the torque transmitted by the fluid flow transmission 4.

As will be evident from the above, the hydraulic power transmission according to the present invention not only does not require any special clutch for effecting and interrupting the power transmission but gets by with a simple fluid transmission with non-adjustable blades, fixed guide wheel ring and permanently filled circuit. In order in the turned off idling period of the driving engine to require as low an idling power as possible, the fluid flow transmission is advantageously, in a manner known per se, so dimensioned that when the turbine wheel is under no load, the transmission will require less power than within the working range, i.e. at highest degrees of efficiency. For the same reason, the pressure in the fluid flow circuit may at low speed of the driving engine be reduceable automatically.

As has been mentioned above, the stress of the clutch or brake device by the engagement will be all the less the lower the admissible speed of the driving engine has been selected therefore. If, for instance, the speed ratio between idling and full load is 1:2.5 and if the clutch can be engaged only during idling, the clutch or brake device will be engaged only at 6.5% of full load and at a speed ratio of 1:4 require only 1.5% of the full load.

It is, of course, to be understood that the present invention is, by no means, limited to the particular constructions shown in the drawings but also comprises any modifications within the scope of the appended claims.

What is claimed is:

1. In combination in a hydraulic power transmission, especially for rail vehicles: a speed variable driving engine, a fluid flow transmission having a pump wheel rigidly drivingly connected to said driving engine and also having a turbine wheel, mechanical change gear transmission means operable to be drivingly connected to said turbine wheel so as to be driven thereby, said change gear transmission means having a lower and a higher velocity range and including clutch means engageable for said lower velocity range and automatically disengaging itself in response to the shifting into said higher velocity range, and control means operatively connected with said clutch means for controlling the engagement and disengagement thereof, said control means including means driven by said engine and operable to influence said control means so as to permit engagement of said clutch means at low speeds only of said driving engine.

2. In combination in a hydraulic power transmission, especially for rail vehicles: a speed variable driving engine, a fluid flow transmission having a pump wheel rigidly drivingly connected to said driving engine and also having a turbine wheel, mechanical change gear transmission means operable to be drivingly connected to said turbine wheel so as to be driven thereby, said change gear transmission means having a lower and a higher velocity range and including clutch means engageable for said lower velocity range and automatically disengaging itself in response to the shifting into said higher velocity range, said clutch means including a packet of compressible friction disc means and counter holding means displaceable by a fluid pressure medium for selectively engaging and disengaging said clutch, and control means operatively connected with said clutch means for controlling the engaging and disengaging thereof, said control means including means driven by said engine and operable to influence said control means so as to permit engagement of said clutch means at low speeds only of said driving engine.

3. A power transmission according to claim 1, in which said fluid flow transmission absorbs less power when said turbine wheel is under no load than within the range of the highest degree of efficiency.

4. In combination in a hydraulic power transmission, especially for rail vehicles: a speed variable driving engine, a fluid flow transmission having a pump wheel rigidly drivingly connected to said driving engine and also having a turbine wheel, mechanical change gear transmission means operable to be drivingly connected to said turbine wheel so as to be driven thereby, said change gear transmission means having a lower and a higher velocity range and including clutch means engageable for said lower velocity range and automatically disengaging itself in response to the shifting into said higher velocity range, control means operatively connected with said clutch means for controlling the engaging and disengaging thereof, said control means including means driven by said engine and operable to influence said control means so as to permit engagement of said clutch means at low speeds only of said driving engine, and means associated with said fluid flow transmission for automatically reducing the pressure in the circuit of said fluid flow transmission in response to the speed of the driving engine dropping below a certain speed.

5. In combination in a hydraulic power transmission, especially for rail vehicles: a speed variable driving engine, a fluid flow transmission having a pump wheel drivingly connected to said driving engine and having a turbine wheel, planetary gear transmission means operable to be drivingly connected to said turbine wheel so as to be driven thereby, said planetary gear transmission means having a lower and a higher velocity range and brake means engageable for said lower velocity range and automatically disengaging itself in response to the shifting into said higher velocity range, said planetary gear transmission means including a sun wheel braked by said brake means in said lower velocity range and also including two parts drivingly interconnected in said higher velocity range, and control means operatively connected with said brake means for controlling the engaging and disengaging thereof, said control means including means driven by said engine and operable to influence said control means so as to permit engagement of said brake means at low speeds only of said driving engine.

6. An arrangement according to claim 5, in which said brake means includes a packet of compressible friction disc means and which also includes counter holding means operable by a pressure fluid medium for selectively controlling the engaging and disengaging of said brake means, said counter holding means forming a non-rotating element.

References Cited by the Examiner

UNITED STATES PATENTS

| | | | |
|---|---|---|---|
| 2,719,440 | 10/1955 | Banker | 74—731 |
| 2,729,980 | 1/1956 | Lammerz et al. | 74—730 X |
| 2,961,895 | 11/1960 | Holdeman | 74—730 X |

DAVID J. WILLIAMOWSKY, *Primary Examiner.*

DON A. WAITE, *Examiner.*

L. S. LAYTON, *Assistant Examiner.*